United States Patent [19]

Schimmel et al.

[11] Patent Number: 6,096,813

[45] Date of Patent: Aug. 1, 2000

[54] N-ACYL AMINO ACID COMPOSITIONS AND THEIR USE AS ADHESION PROMOTERS

[75] Inventors: Karl F. Schimmel, Verona; Dennis W. Jones, Glenshaw; Umesh C. Desai, Wexford, all of Pa.

[73] Assignee: PPG Industries Ohio, Inc., Cleveland, Ohio

[21] Appl. No.: 08/936,563

[22] Filed: Sep. 24, 1997

[51] Int. Cl.$^7$ ...................................................... C08L 5/48
[52] U.S. Cl. ................................................................ 524/219
[58] Field of Search ............................................. 524/219

[56] References Cited

U.S. PATENT DOCUMENTS

| | | | |
|---|---|---|---|
| 5,209,788 | 5/1993 | McMillen et al. | 148/247 |
| 5,275,848 | 1/1994 | Mito et al. | 427/409 |
| 5,294,265 | 3/1994 | Gray et al. | 148/250 |
| 5,306,526 | 4/1994 | Gray et al. | 427/309 |

OTHER PUBLICATIONS

CA 128:62283, "Polyimide compositions..." Kawamozen et al., Mar. 1997.

CA 128:103249, "Evaluation of some organic compounds..." Abdel–Bary et al., Jan. 1997.

CA:104:20292, "Poly(vinyl chloride)–based polymeric compositions..." Karpacheva et al., Aug. 1987.

Free–Radical–Initiated Polymerzation of 6–Maleimidocholesterylhexonate and 4–Maleimidocholesterylbenzoate and Copolymerization with α–Methylstyrene, J.M.S., Pure Appl. Chem., A32 (8&9), pp. 1461–1469 (1995).

*Primary Examiner*—Peter D. Mulcahy
*Attorney, Agent, or Firm*—Dennis G. Millman

[57] ABSTRACT

Disclosed are curable compositions such as adhesives and coatings containing as an adhesion promoter N-acyl amino acids having the structure:

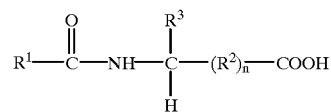

wherein n is 0 or 1, $R^1$ is an alkyl or aryl group having from one to 10 carbon atoms optionally including —COOH, $R^2$ is an alkylene or arylene group having from one to 10 carbon atoms, and $R^3$ is H, —COOH, alkyl or aryl groups having from one to 10 carbon atoms, or carboxyl-substituted alkyl or aryl groups having from one to 10 carbon atoms.

16 Claims, No Drawings

N-ACYL AMINO ACID COMPOSITIONS AND THEIR USE AS ADHESION PROMOTERS

BACKGROUND OF THE INVENTION

The present invention relates to improving adhesion of polymeric materials to substrates, particularly curable compositions and film-forming compositions. Although not limited thereto, utility is particularly contemplated in the fields of adhesives and coatings.

Spot welding has been used in the past for structural support in doors, deck lids and hoods of automobiles; however, these weld points are sources of corrosion as well as cosmetic blemishes when done on exterior panels. Moreover, two-sided galvanized metals which are more frequently utilized do not readily lend themselves to spot welding. As a result, there has been a movement away from spot welding and toward use of structural adhesives either instead of or in conjunction with spot welding.

High strength structural adhesives are typically epoxy based compositions, and although they have good structural integrity, many are characterized by certain disadvantages, including non-uniform adhesion, variable corrosion resistance, lengthy cure times, poor adhesion to oily metal, high cost and toxicity problems.

Rubber-based vulcanizable compositions are also known in the art and have been typified by excellent strength and elongation. While these formulations offer good cure properties and weathering resistance, their utility has been limited by inconsistent adhesion to a variety of oily metals. Improving adhesion of rubber-based vulcanizable compositions to metals has been difficult, and adequate adhesion to substrates such as aluminum is rarely achieved. Rubber-based vulcanizable compositions with high sulfur loadings capable of further enhancing the strength and hardness of the rubber also suffer from poor or selective adhesion.

Adhesion promoters are also useful for coating compositions. Improving adhesion of organic, film-forming compositions to metal substrates is frequently sought after.

SUMMARY OF THE INVENTION

It is an object of the present invention to provide an adhesion promoter for use in organic, polymeric compositions to improve their adhesion to metal substrates such as aluminum and galvanized steel, while maintaining the strength, elongation, cure properties, and weathering resistance of the compositions.

In accordance with the present invention, there is provided a curable composition containing an N-acyl amino acid composition having the structure:

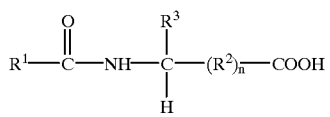

wherein n is 0 or 1, $R^1$ is an alkyl or aryl group having from one to 10 carbon atoms optionally including —COOH, $R^2$ is an alkylene or arylene group having from one to 10 carbon atoms, and $R^3$ is H, —COOH, alkyl or aryl groups having from one to 10 carbon atoms, or carboxyl-substituted alkyl or aryl groups having from one to 10 carbon atoms.

The N-acyl amino acid compound described above may be incorporated, for example into adhesive compositions or coating compositions.

DETAILED DESCRIPTION

The N-acyl amino acid used in the compositions of the present invention is prepared by reacting an amino acid with a carboxylic acid or anhydride. Suitable amino acids include those having from about 2 to about 20 carbon atoms, preferably about 2 to about 12 carbon atoms. The amino acids may include alkyl or substituted alkyl or aryl or substituted aryl groups. The alkyl portion may be cyclic, linear or branched alkyl, substituted or unsubstituted, saturated or unsaturated. Suitable substituents include aryl, alkoxy, and hydroxy. The amino acids may be mono- or diacids, and may be primary or secondary amino acids. Examples of suitable amino acids include, for example, alanine, glycine, N-acetyl glycine, glutamic acid, and the like. Alpha amino acids are preferred, although other amino acids such as aminocaproic acid are suitable.

Suitable carboxylic acids or anhydrides to be reacted with the amino acid include those having from 2 to 12 carbon atoms. The carboxylic acids may be mono- or diacids, and may be saturated or unsaturated. Examples include acetic acid or anhydride, adipic acid, azelaic acid, benzoic acid, crotonic acid, fumaric acid, hexahydrophthalic anhydride, methylhexahydrophthalic anhydride, maleic anhydride, phthalic anhydride, dodecanedioic acid, sebacic acid, succinic anhydride, and the like.

In the preparation of the N-acyl amino acid, the carboxylic acid or anhydride is charged to a stirred reactor in an equivalent ratio (amino group to acid or anhydride) of about 1:1 to about 1:2. If necessary, either component may be dissolved in a suitable solvent such as acetic acid or a lower alkyl ester thereof. The amino acid is added slowly and the temperature allowed to increase to about 35° C. as the reaction progresses. The reaction temperature is maintained at about 20 to 25° C. using an ice bath or other cooling means until completion.

The N-acyl amino acids are used as adhesion promoters in compositions such as curable adhesive compositions and film-forming compositions.

Preferred adhesive compositions include rubber-based adhesive compositions such as those comprising polybutadiene rubbers. The N-acyl amino acid may be present in an amount ranging from about 0.1 to about 5 percent by weight based upon the total weight of the curable adhesive composition. Amounts below about 0.1 percent may be too low to observe any effect; amounts above about 5 percent, while not detrimental, simply add to the cost of the composition. In a preferred embodiment of the invention, the N-acyl amino acid is typically present in an amount ranging from about 0.8 to about 1.2 percent by weight based upon the total weight of the curable adhesive composition. The amount of the N-acyl amino acid component for effective improvement in adhesion will vary, depending upon the particular curable coating composition with which it is used.

A component of embodiments of rubber-based curable adhesive compositions is a functional rubber polymer selected from the group consisting of functional homopolymers of polybutadiene, isoprene or neoprene; functional copolymers of polybutadiene, isoprene and/or neoprene; and functional copolymers of polybutadiene, isoprene or neoprene with an aliphatic or alicyclic unsaturated hydrocarbon. By "functional rubber polymer" is meant a rubber polymer from the list above containing hydroxyl, thiol, amine, amide, carboxyl, epoxy, isocyanate, anhydride or acetoacetoxy groups. These groups can be pendant or terminal, but preferably are terminal. These functional groups of the functional rubber polymer remain essentially unreacted during cure of the composition.

The polybutadiene component of the functional rubber polymer can be made from 1,3-butadiene, 1,4-butadiene or 2,3-dimethyl-1,3-butadiene. Neoprene is polychloroprene. Isoprene is 3-methyl-1,3-butadiene or 2-methyl-1,3-butadiene.

Examples of suitable aliphatic or alicyclic hydrocarbons which can be copolymerized with polybutadiene, isoprene or neoprene to yield a functional rubber polymer include terpene, pinene, indene and dicyclopentadiene.

Typically, vulcanizable or non-vulcanizable nonfunctional synthetic rubbers are used in conjunction with the functional rubber polymer detailed above. Examples of such synthetic rubbers include butyl rubber, ethylene propylene terpolymer, silicone rubbers, polysulfides and chlorinated polyethylene rubbers. Copolymers of many of the aforelisted synthetic rubbers with styrene can also be utilized.

The rubber-based curable composition contains at least 15 parts of functional rubber polymer per 100 parts of composition, preferably at least 20 parts.

The functional rubber polymer generally has a number average molecular weight not exceeding 15,000, preferably not exceeding 8000. Typically, the number average molecular weight of the functional rubber polymer ranges from about 1500 to about 5000. The molecular weight is determined using gel permeation chromatography (GPC) using a polystyrene standard.

The other principle constituent of the rubber-based curable composition is a sulfur-containing vulcanization composition. Vulcanization is the physicochemical change resulting from crosslinking of the double bonds of the functional polymer with sulfur, generally with application of heat. Typically the sulfur is utilized with an activator and an accelerator, and preferably a combination of primary and secondary accelerators is utilized. By "activator" is meant a material utilized to increase the vulcanization rate by complexing the accelerator and allowing it to perform more effectively.

The classification of an accelerator is based on the effect it has on the speed of the vulcanization reaction. Primary accelerators are catalysts used either exclusively or in the largest proportions and produce satisfactory cures within specified times. Secondary accelerators (typically utilized at levels of 10 to 20 percent of the total catalyst) are used to activate the primary accelerator and to improve final physical properties.

Examples of suitable activators include heavy metal oxides such as magnesium oxide, magnesium hydroxide, iron oxide and calcium oxide. Examples of primary accelerators include 2-mercaptobenzothiazole; 4-morpholinyl-2-benzothiazole; copper dimethyldithiocarbamate; lead diamyldithiocarbamate; lead dimethyldithiocarbamate; tellurium diethyldithiocarbamate, zinc diethyl dithiocarbamate, tetramethylthiuram monosulfide and 4,4' dithiomorpholine. Suitable secondary accelerators are exemplified by benzothiazyl disulfide, N-oxydiethylene 2-benzotriazole sulfenamide; N-cyclohexyl-2-benzothiazolesulfenamide, dipentamethylene thiuram tetrasulfide, tetraethylthiuram disulfide, 1,3-dibutyl thiourea and N,N'-diorthotolylguanidene.

For use in induction curable compositions, the zinc lower alkyl dithiocarbamate accelerators are preferred. These materials are commercially available in association with zinc in salt form, namely zinc dibutyl dithiocarbamate, zinc diethyl dithiocarbamate, zinc dimethyl dithiocarbamate and zinc diamyl dithiocarbamate. These materials can be commercially obtained from Vanderbilt Chemical Company under the trade name ZIMATE.

If desired, in the absence of primary accelerator, higher levels of secondary accelerators can be used with little or no loss in performance.

The amount of sulfur which is part of the vulcanization composition is at least 15 parts per 100 parts of the total amount of all rubber polymers in the composition. By this is meant that the 100 parts is based on the total amount of all rubber polymers present which includes not only the functional rubber polymer discussed above but also any vulcanizable or nonvulcanizable nonfunctional synthetic rubbers used as extenders in the composition. Preferably at least 20 parts of sulfur per 100 parts of total rubber are utilized. The sulfur can be utilized in a variety of forms but typically it is elemental sulfur and it is used as a solid oil-treated powder. For example, suitable sources of sulfur are the CRYSTEX brand sulfurs which are commercially available from Stauffer Chemical Company.

Note that the accelerator materials discussed above can contribute a minor amount of the required sulfur in the vulcanization composition.

The adhesive compositions can comprise a variety of other optional additives in addition to the principle constituents which have been detailed above. Examples of additives include fillers such as calcium carbonate, stearic acid treated calcium carbonate, polybutadiene treated calcium carbonate, barium sulfate, calcium and magnesium oxide, carbon blacks, hydrocarbon tackifiers and various phthalate and adipate plasticizers and antioxidants. Examples of suitable antioxidants are butylated hydroxytoluene, butylated and styrenated phenols and cresols, alkylated quinones and hydroquinones and butylated hydroxy benzyl isocyanates.

The curable adhesive compositions of the present invention may also contain a variety of additives including pigments such as carbon black, fillers such as calcium oxide and wollastonite, and thixotropes such as bentonite clay in amounts conventionally used in curable adhesive compositions.

The curable composition may be applied to a substrate in a number of ways including spraying, extrusion, or by hand with a blade. Extrusion is the preferred method of application. Particularly preferred substrates include aluminum and galvanized steel.

The composition may be cured by heating to a temperature of about 120° C. to about 200° C. for a period ranging from about 4 seconds to 30 minutes. Preferably the composition is cured by induction heating. In this process the curable composition is applied to a metal surface such as a flanged fixture associated with an automotive body panel. An induction coil operating with an electrical frequency of about 5 to about 30 megahertz, from an electromagnetic field generated by a power source of about 1 to about 30 kilowatts, more typically from about 5 to about 25 kilowatts, is positioned in close proximity to the coated surface so as to raise the temperature of the metal surface to a level sufficient to initiate cure of the composition, typically to a range of about 150° C. to about 180° C. The induction coil is maintained in position for a time sufficient to complete cure of the composition, typically for about 4 to 45 seconds, preferably for about 4 to about 11 seconds.

The N-acyl amino acids may also be used as additives in film-forming (coating) compositions, including pretreatment conversion-type coatings or rinses. Typically the N-acyl amino acid is present in an amount ranging from about 5 to about 20 percent by weight, preferably about 10 to about 15 percent by weight, based upon the total weight of solids in the film-forming composition.

Suitable pretreatment conversion-type film-forming compositions include those described in U.S. Pat. Nos. 5,294,265 and 5,306,526,. incorporated herein by reference.

The pretreatment conversion-type film-forming compositions of the present invention can be used to the greatest advantage on metal substrates that include zinc, aluminum, and alloys thereof.

The compositions can be applied by conventional means including brushing, immersing, flow coating, spraying and the like. Pretreatment film-forming compositions are usually applied by immersion.

The invention will further be described by reference to the following examples. Unless otherwise indicated, all parts are by weight.

EXAMPLE A

The following ingredients were used to prepare an N-acyl amino acid composition:

|  | Parts by Weight |
| --- | --- |
| Charge I | |
| Maleic anhydride | 367.5 |
| Acetic acid | 1835.8 |
| Charge II | |
| 6-aminocaproic acid | 490.0 |
| Acetic acid | 1835.8 |
| Rinse | |
| Acetic acid | 20.0 |

Charge I was added to a suitable reactor and the maleic anhydride dissolved in acetic acid while the mixture was stirred. Charge II was added over a period of one and one half hours. Additionally, acetic acid was used as a rinse. The temperature of the reaction mixture was maintained at 20 to 22° C. using an ice water bath. After the addition was complete, the reaction mixture was stirred at 20 to 22° C. for three and one half hours. The reaction product was filtered to yield a white powder.

EXAMPLES 1–3

The following examples illustrate the preparation of adhesive compositions containing N-acyl amino acid compositions. Example 1 is a control containing no additive. Example 2 contains the material of Example A, and Example 3 contains N-acetylglutamic acid (CAS 1188-37-0).

Adhesive compositions were prepared by mixing together the following ingredients:

| | Example: | | |
| --- | --- | --- | --- |
| Ingredient: | 1 | 2 | 3 |
| WINNOFIL SPT[1] | 27.2 | 27.2 | 27.2 |
| POLYOIL 130[2] | 27.2 | 27.2 | 27.2 |
| Calcium carbonate | 58.2 | 58.2 | 58.2 |
| Zinc oxide | 5.4 | 5.4 | 5.4 |
| Carbon black | 1 | 1 | 1 |
| Sulfur | 23.4 | 23.4 | 23.4 |
| RICON 150[3] | 10.9 | 10.9 | 10.9 |
| CABOSIL TS-720[4] | 0.96 | 0.96 | 0.96 |
| RICON 130MA-13[5] | 15.46 | 15.46 | 15.46 |
| LITHENE AL[6] | 15.46 | 15.46 | 15.46 |
| Amyl ZIMATE[7] | 4 | 4 | 4 |
| SANTOGARD PVI[8] | 1 | 1 | 1 |
| N-acyl amino acid composition of Example A | — | 2 | — |
| N-acetyl glutamic acid | — | — | 2 |

[1]Surface treated calcium carbonate, available from ICI Resins.
[2]Liquid polybutadiene having approximately 75% 1,4-cis double bonds, 24% 1,4-trans double bonds, and 1% vinyl double bonds, available from Bunawerke Hüls GmbH.
[3]Polybutadiene rubber having a number average molecular weight of about 2400, available from Ricon Resins, Inc.
[4]Hydrophobic fumed silica, available from Cabot Corporation
[5]Maleinized polybutadiene rubber, 13% maleic adduct on solids, available from Ricon Resins, Inc.
[6]Benzyl-terminated polybutadiene rubber having a number average molecular weight of 1000, available from Revertex, Ltd., UK.
[7]Zinc diamyl dithiocarbamate available from R. T. Vanderbilt Co., Inc.
[8]N-(cyclohexylthio)phthalimide, available from Monsanto Company.

The compositions of Examples 1 to 3 were evaluated for lap shear strength at room temperature and elevated temperature, and T-peel strength as follows:

LAP SHEAR STRENGTH:

Lap shear bonds for testing were prepared using two strips of aluminum metal 1 inch ×4 inches×0.032 inches (2.54 cm×10.16 cm×0.178 cm). A 20 mil (0.051 cm) thick film of the composition being tested was applied to one of the metal strips and then the second identical strip was placed into contact with the adhesive composition so that only a 0.50 square inch area overlapped. The bond was then cured at 350° F.(177° C.) for 30 minutes. Lap shear strengths were determined according to ASTM-D-1002-65 at room temperature and at 80° C. The ends of the strips were separated at 0.5 inch per minute with an INSTRON tester. The data in Table I are each an average of three separate determinations, reported in pounds per square inch (PSI) of force at separation.

T-PEEL STRENGTH:

T-peel bonds for testing were prepared using two strips of aluminum metal 1 inch×4 inches×0.032 inches (2.54 cm×10.16 cm×0.178 cm). The metal strips were each bent into 1 inch×3 inch (2.54 cm×7.62 cm) "L" shapes. A 20 mil (0.051 cm) thick film of said composition was applied to the 3 inch section of one of the metal strips and then the second identical strip was placed "back to back" to form a "T" shape. The bond was then cured at 350° F.(177° C.) for 30 minutes, and subsequently T peel strengths were measured in pounds per square inch (PSI) at room temperature. The ends of the strips were separated at 0.5 inch per minute with an INSTRON tester. The data in Table I are each an average of three separate determinations.

The failure mode of the adhesive bond was also noted. Adhesive failure indicates separation of the adhesive composition from the substrate surface at the interface. Cohesive failure indicates separation of the adhesive composition within itself. Cohesive failure is preferred to adhesive failure.

The results are reported in Table I below:

TABLE 1

| Property: | Example: 1 | 2 | 3 |
|---|---|---|---|
| Room Temperature Lap Shear | 2180 psi cohesive/ adhesive failure* | 2050 psi cohesive failure | 2285 psi cohesive failure |
| High Temperature Lap Shear | 1817 psi cohesive/ adhesive failure | 1560 psi cohesive failure | 1800 psi cohesive failure |
| T-peel Strength | 2.65 psi cohesive/ adhesive failure | 3.80 psi cohesive failure | 3.22 psi cohesive failure |

*"Cohesive/adhesive failure" indicates that the failure occurred within the adhesive composition, but only a thin film of composition remained on the substrate such that the failure was substantially adhesive in nature.

The data in the table indicate that the curable compositions of the present invention have improved T-peel strength compared to a control composition which contains no N-acyl amino acid. Note that though the lap shear strength appears to have decreased, the failure mode was cohesive in nature.

Specific embodiments have been set forth with detail herein for the sake of disclosing the best mode of the invention, but it should be understood that other variations and modifications that would be evident to those of skill in the art are encompassed by the invention as defined by the claims.

We claim:

1. A polymeric composition adapted to be bonded onto a substrate, comprising:
    (a) a curable polymeric component; and
    (b) an effective amount sufficient to enhance adhesion to the substrate of N-acyl amino acid having the structure:

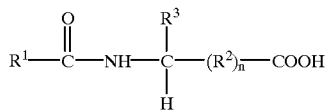

wherein n is 0 or 1, $R^1$ is an alkyl or aryl group having from one to 10 carbon atoms optionally including —COOH, $R^2$ is an alkylene or arylene group having from one to 10 carbon atoms, and $R^3$ is H, —COOH, alkyl or aryl groups having from one to 10 carbon atoms, or carboxyl-substituted alkyl or aryl groups having from one to 10 carbon atoms.

2. The composition of claim 1, wherein said curable composition is an adhesive composition.

3. The composition of claim 2, wherein said curable composition includes a rubber component.

4. The composition of claim 3, wherein said rubber component comprises:
    (a) a rubber polymer selected from the group consisting of homopolymers of polybutadiene, isoprene or neoprene; copolymers of polybutadiene, isoprene and/or neoprene; and copolymers of polybutadiene, neoprene or isoprene with an aliphatic or alicyclic unsaturated hydrocarbon; and
    (b) a vulcanization composition comprising sulfur.

5. The composition of claim 4, wherein said rubber component comprises:
    (a) a functional rubber polymer selected from the group consisting of functional homopolymers of polybutadiene, isoprene or neoprene; functional copolymers of polybutadiene, isoprene and or neoprene; and functional copolymers of polybutadiene, neoprene or isoprene with an aliphatic or alicyclic unsaturated hydrocarbon; and
    (b) a vulcanization composition comprising sulfur; and wherein the curable composition contains at least 15 parts of functional rubber polymer per 100 parts of curable composition and at least 15 parts of sulfur per 100 parts of the total amount of all rubber polymers in the curable composition.

6. The composition of claim 5, wherein the cured composition has an elongation not exceeding 15 percent.

7. The composition of claim 5, wherein the functional groups present on the functional rubber polymer of (a) remain essentially unreacted during cure of the adhesive composition.

8. The composition of claim 5 wherein the functional rubber polymer is a hydroxyl functional homopolymer of polybutadiene.

9. The curable composition of claim 1 wherein the N-acyl amino acid is present in an amount of about 0.8 to about 1.2 percent by weight based upon the total weight of the curable composition.

10. The curable composition of claim 8 wherein $R_1$ has a terminal acid functional group.

11. The composition of claim 8 wherein said N-acyl amino acid is derived from an alpha amino acid reacted with an acid or anhydride.

12. The composition of claim 11 wherein said N-acyl amino acid is derived from glutamic acid reacted with acetic anhydride.

13. The composition of claim 8 wherein said N-acyl amino acid is derived from epsilon-aminocaproic acid reacted with maleic anhydride.

14. The composition of claim 1 wherein the polymeric component is a coating composition.

15. The composition of claim 14 wherein the composition further includes a pigment component.

16. The film-forming composition of claim 14, wherein said coating composition is a pretreatment conversion coating composition.

* * * * *